WILLIAM H. SILBERHORN, OF NEW YORK, N. Y.

Letters Patent No. 91,678, dated June 22, 1869.

IMPROVEMENT IN CURING MEAT.

The Schedule referred to in these Letters Patent and making part of the same.

*To all whom it may concern:*

Be it known that I, WILLIAM H. SILBERHORN, of the city and county of New York, in the State of New York, have invented a new and improved Process for Curing Meat; and I do hereby declare that the following is a full, clear, and exact description of the same, which will enable those skilled in the art to make and use the same.

The invention relates to a new and improved process for curing and preserving meat, having for its object to prevent and arrest the decay around the bones or any internal parts, where the ordinary curing and preserving-processes often fail to act, and where the decay most usually commences.

The invention consists in the application, by any approved means, to these places, of pulverized, but solid salt, saltpetre, or other preservative substances, to be inserted, in any way, between the flesh and the bones, or into the flesh near the bones.

As one means for carrying out my invention, by depositing the said preserving and curing-substances, I use an instrument similar in form to a pair of forceps, except that the jaws are sharp and hollow, the sharpened ends serving to penetrate the flesh, to carry the substance to the place where it is desired to deposit it, the said substance being conveyed in the said hollow space.

When thus inserted, the jaws are forced open, by pressure on the handles, sufficiently to deposit the saltpetre or other substance.

Other devices may be used, as found best adapted for the purpose.

I propose to make this application to meat previously to packing in brine, or to putting it up for keeping, by any other means.

This improvement I have found of great value, especially in packing pork in warm weather, when it is very liable to decay in the interior portions around the bones, before the brine or other curing-matter penetrates sufficiently to prevent it.

Having thus described my invention,

What I claim as new, and desire to secure by Letters Patent, is—

The herein-described process for curing or preserving meat, by depositing within the same solid saltpetre, salt, or other preservative substances, substantially in the manner specified.

The above specification of my invention signed by me, this 12th day of May, 1869.

WM. H. SILBERHORN.

Witnesses:
   FRANK BLOCKLEY,
   O. L. TOPLIFF.